May 27, 1930.  J. ABENANTI  1,760,463
MEANS FOR PREVENTING OIL LEAKAGE
Filed Aug. 23, 1926
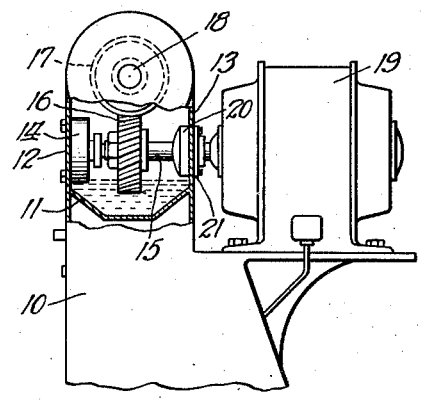
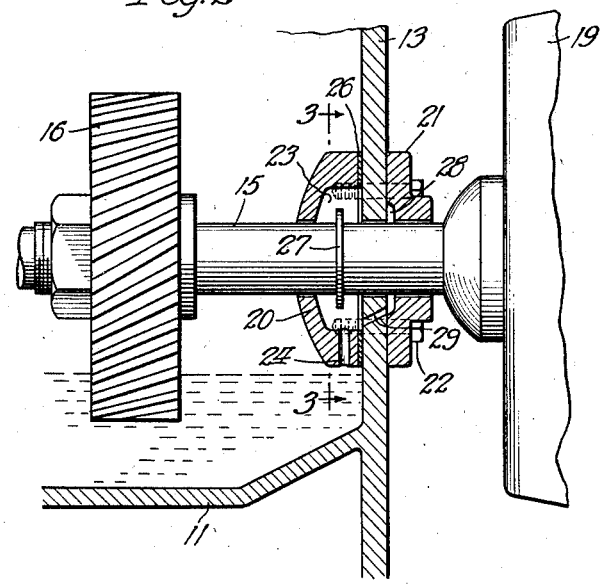
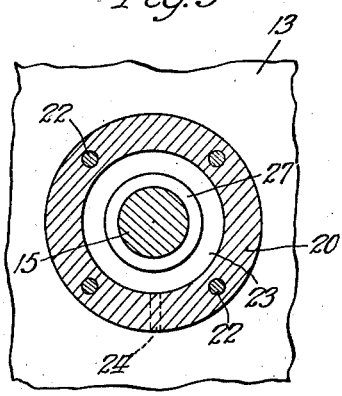
Inventor
Joseph Abenanti
by Fabel & Banning Attys.

Patented May 27, 1930

1,760,463

UNITED STATES PATENT OFFICE

JOSEPH ABENANTI, OF CHICAGO, ILLINOIS, ASSIGNOR TO CROWN RHEOSTAT & SUPPLY CO., OF CHICAGO, ILLINOIS, A CORPORATION OF ILLINOIS

MEANS FOR PREVENTING OIL LEAKAGE

Application filed August 23, 1926. Serial No. 130,969.

This invention relates to means for preventing leakage of oil from casings such as gear casings wherein the moving parts run partially submerged in oil.

More particularly, the object of this invention is to prevent leakage of oil from gear casings along the rotating shaft which extends from said casing through a wall thereof to avoid the waste of oil and the danger of it spreading over the machinery and increasing the fire risk as well as destroying the body of the machinery such as motors and the like.

Another object is to provide such means without having to provide a tight fit around the shaft where it goes through the wall of the gear casing or without using a stuffing box or packing around the shaft and thus cause friction and increase the power necessary to drive the shaft.

Another object of the invention is to provide with the means for keeping the oil from travelling beyond a certain point on the shaft, a shield which prevents the gears or other mechanism running partly submerged in oil from throwing oil onto the shaft beyond that point.

Furthermore, it is the object of this invention to provide in addition to the means in the gear casing for keeping the oil from leaking out along the shaft, a second means outside the casing which also aids in preventing leakage of the oil and a drain from this outside means for returning the oil which may escape through the casing wall back to the gear casing for further use.

In the accompanying drawings wherein the preferred form of my invention is shown, Fig. 1 is an end view partly in section of an apparatus to which my device may be attached;

Fig. 2 is an enlarged cross section showing the particular means I use to prevent the oil from escaping from the gear casing; and Fig. 3 is a section on the line 3—3 of Fig. 2.

In the drawings, 10 indicates the base upon which the gear casing having the bottom 11, the sides 12 and 13 is mounted. Inside the gear casing is a bearing 14 for one end of the shaft 15 which carries the gear 16 meshing with another gear 17 on the shaft 18, which shaft may be connected to any tool, such as a buffing or grinding tool to operate it. The motor 19 is mounted on a shelf of the base 10 and serves as the means for driving the shaft 15 which extends through the side wall 13.

My particular means for preventing the oil from escaping along the shaft 15, when it is thrown up by the rotation of the gear 16 through the pool of oil in the bottom of the casing, consists of the two members 20 and 21 shown more clearly in Fig. 2 and the member 27 on the shaft 15. The member 20 has a recess 23 in the face thereof adjacent the casing wall 13 and at the bottom of this recess a drain opening 24 is provided for returning the oil in the recess back to the main casing for further use. The bolts 22 extend through the member 21 and the gear casing wall 13 into the member 20 to retain the members in place. Between the inner wall of the casing 13 and the member 20 is provided a packing ring 26 to prevent any leakage of oil from the top of the member 20 down inside the recess 23 and onto the shaft. At this point I wish to point out that the shaft 15 does not bear on either the members 20, 21 or the wall 13, but fits loosely in these three members, each of which has an opening sufficiently large to allow clearance for the shaft and its rotation, thus any friction such as is present when a stuffing box or packing is used about the shaft is avoided. The collar 27 fits tightly around the shaft 15 and extends outwardly therefrom to form a means for directing the oil, which in the ordinary rotation of the device creeps along the shaft 15, and, due to the centrifugal force caused by the rotation of the shaft 15, the oil is forced to the outer edge of the member 27 and from there is thrown off into the recess 23 and flows downwardly through the opening 24 and to the main pool of oil in the bottom of the gear casing.

I have provided an additional means to catch any oil that may escape along the shaft beyond the member 27. This means consists of the recess 28 which is provided in the face of the member 29 adjacent the wall 13 and in combination with said wall forms a pocket into which the oil may gather and drain back through the opening 29 in the wall 13 to the recess 23 and from there through the opening 24 into the main casing. Thus it will be seen that I have provided a simple, cheap and effective means for preventing the leakage of oil along the shaft and for returning the oil which creepes outwardly along the shaft back to the bearing casing. It is thought that the operation of the device is sufficiently clear from the above description and need not further be taken up at this point.

While I have described one form which my invention may take, it is obvious that it may be modified in various ways and I wish it to be understood that I intend to avail myself of all such modifications or variations as may come within the scope of the appended claims.

Having thus described my invention, what I desire to claim and secure by Letters Patent is:

1. Means for preventing leakage of oil from an oil containing casing having a rotating member therein and a shaft extending from said member through a wall of said casing, comprising a member on one side of said wall having an opening therethrough loosely receiving said shaft and having a recess therein about said shaft in the side of said member adjacent said wall, and a collar on said shaft within said recess for causing the oil to be directed away from said shaft into said recess by centrifugal force due to the rotation of said shaft, said member having a drain opening therein for draining the oil from said recess, a second member on the other side of said wall having an opening therethrough loosely receiving said shaft and having a recess about said shaft in the side thereof adjacent said wall, said wall having a drain opening therethrough connecting the two recesses.

2. Means for preventing leakage of oil from an oil containing casing having a rotating device therein and a shaft extending from said device through a wall of said casing comprising a member within said casing having a rim portion encircling the wall opening for said shaft and secured to the wall and an inwardly extending portion spaced from said wall having an opening therethrough for said shaft and means on said shaft between said member and wall for directing the oil on said shaft outwardly therefrom and causing it to be thrown off by the centrifugal force due to the rotation of said shaft, said member serving as a screen to prevent oil from being thrown on said shaft between the member and wall.

3. A device of the character described comprising a gear casing having an aperture in a side wall thereof, a shaft extending through said aperture, a cup-like member within said casing apertured to receive said shaft, a second cup-like member exteriorly of said casing apertured to receive said shaft, means securing said members to said side wall, said wall having a drainage duct connecting the recesses in said members, an annular enlargement on said shaft within one of said recesses, and drain means leading from the recess in said first member into said casing.

In witness whereof, I hereunto subscribe my name this 28th day of July, A. D. 1926.

JOSEPH ABENANTI.